US011399035B1

(12) United States Patent
Batchu

(10) Patent No.: US 11,399,035 B1
(45) Date of Patent: Jul. 26, 2022

(54) DEEP LEARNING-BASED DETECTION OF PHISHING LINKS

(71) Applicant: CLOUDFLARE, INC., San Francisco, CA (US)

(72) Inventor: Umalatha Batchu, Cupertino, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 547 days.

(21) Appl. No.: 16/431,180

(22) Filed: Jun. 4, 2019

(51) Int. Cl.
*H04L 29/06* (2006.01)
*H04L 9/40* (2022.01)
*G06N 5/02* (2006.01)
*G06N 3/08* (2006.01)

(52) U.S. Cl.
CPC .......... *H04L 63/1416* (2013.01); *G06N 3/08* (2013.01); *G06N 5/02* (2013.01)

(58) Field of Classification Search
CPC ......... H04L 63/1416; G06N 3/08; G06N 5/02
See application file for complete search history.

(56) References Cited

U.S. PATENT DOCUMENTS

2020/0036750 A1* 1/2020 Bahnsen .............. G06N 3/0445

OTHER PUBLICATIONS

Mikolov et al., "Distributed Representations of Words and Phrases and their Compositionality", dated 2013, 9 pages.

(Continued)

*Primary Examiner* — Jeffrey C Pwu
*Assistant Examiner* — Thong P Truong
(74) *Attorney, Agent, or Firm* — Nicholson De Vos Webster & Elliott, LLP

(57) ABSTRACT

In an embodiment, the disclosed technologies include extracting, from a link contained in an electronic message received from an upstream device on a network, first unit-level input data of a first semantic type and second unit-level input data of a second semantic type; in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing; combining the first and second unit-level classification data with at least one numeric feature that has been extracted from context data to produce link-level input data; in response to inputting the link-level input data into a third deep learning model, outputting, by the third deep learning model, link-level classification data, the third deep learning model having been trained to recognize patterns of syntactic features and semantic features and numeric features that are predictive of phishing; in response to the link-level classification data matching a criterion, causing the network to modify, delay, or block transmission of the electronic message to a downstream device.

30 Claims, 5 Drawing Sheets

(56) References Cited

OTHER PUBLICATIONS

Ma et al., "Beyond Blacklists: Learning to Detect Malicious Web Sites from Suspicious URLs", KDD'09, dated 2009, Paris, France, 9 pages.
Hasegawa et al., "One-Dimensional Convolutional Neural Networks or Android Malware Detection", 2018 IEEE 14th International Colloquium on Signal Processing & its Applications, dated Mar. 2018, 5 pgs.
Blum et al., "Lexical Feature Based Phishing URL Detection Using Online Learning", AlSec'10, Oct. 8, 2010, Chicago, Illinois, USA, 7 pages.

* cited by examiner

US 11,399,035 B1

DEEP LEARNING-BASED DETECTION OF PHISHING LINKS

TECHNICAL FIELD

One technical field of the present disclosure is computer security. Another technical field of this disclosure is prevention of malware attacks propagated by electronic messages. Another technical field of this disclosure is machine learning-based classification of data contained in electronic messages transmitted over a computer network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer networks facilitate the communication of electronic messages. Malware is frequently propagated via electronic messages. Network applications attempt to protect computers and networks from malware attacks. However, the purveyors of malware continue to find ways to circumvent the protective measures.

SUMMARY OF THE INVENTION

The appended claims may serve as a summary of the invention.

DETAILED DESCRIPTION

Figure 1:
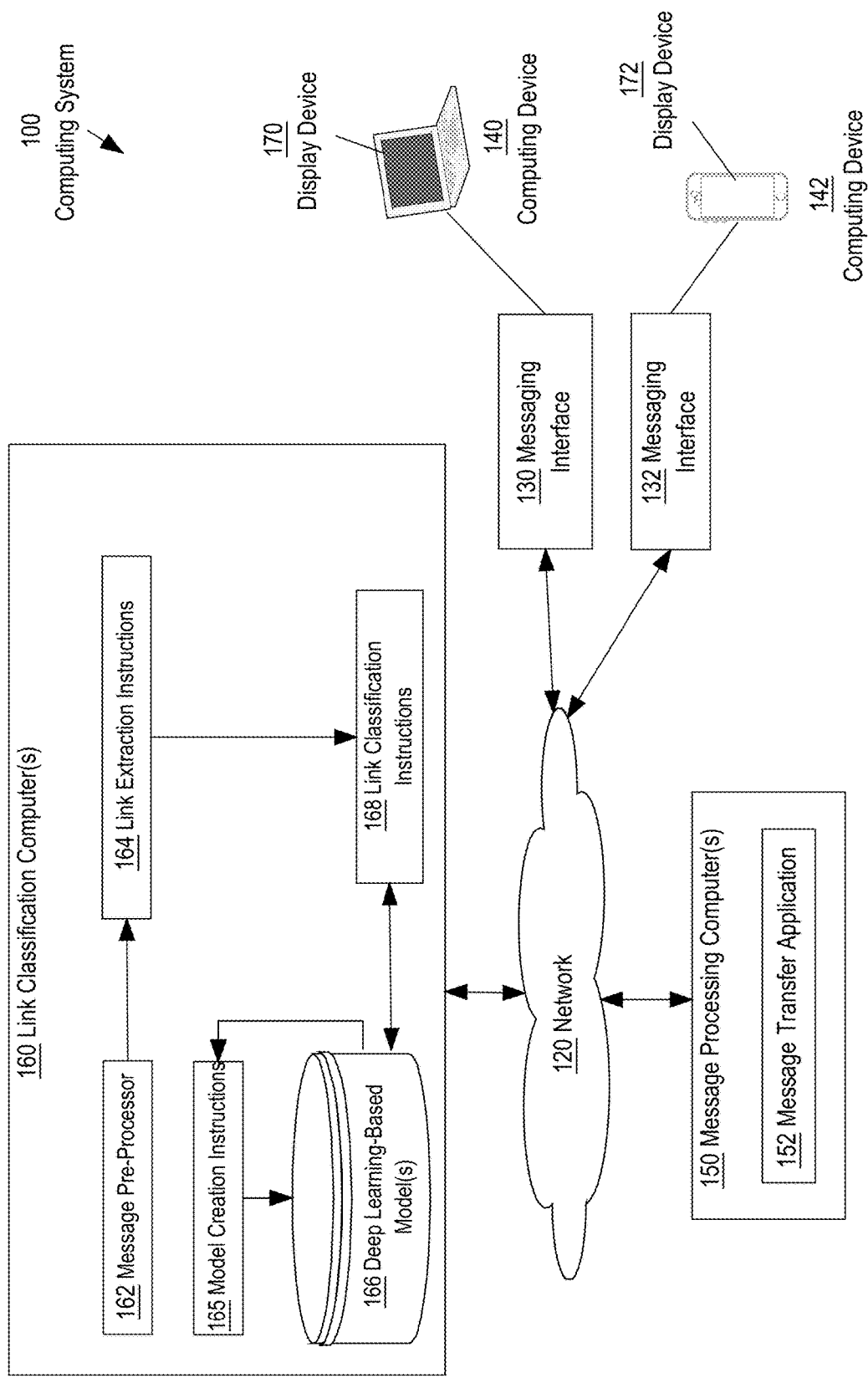
FIG. 1 is a block diagram that depicts an example networked computing system, in an embodiment.

This detailed description refers to the different drawings by specifying the numbers of the figures, and to the different parts by the use of reference numerals. While specific embodiments are described, the subject matter regarded as an invention is particularly pointed out by the appended claims and need not be limited by the details of the described embodiments.

General Overview

Phishing malware often tricks users into divulging sensitive personal or business information by appearing to be legitimate. Distinguishing electronic communications that contain malware from legitimate communications is increasingly challenging as malware purveyors continue to attempt to evade detection efforts.

For example, some phishing sites try to lure the user into clicking a malicious link by including "bait" words or phrases, such as brand names or other attention-grabbing terms or phrases, in the link text. If the user clicks on the link, the web page that is displayed is often a replica of a familiar page such as the login page of a well-known company or brand, but in actuality the page is not associated with any legitimate brand. The web page may impersonate a legitimate fill-in form in an attempt to directly collect the user's personal data including login credentials and other transactional web content. Other malicious web sites operate by surreptitiously downloading malware to the user's machine when the user unwittingly clicks on a link that contains the bait. The malware then self-executes on the user's machine to harvest credentials and/or other valuable information such as email addresses in the user's digital address book. In some cases, the malware may even self-propagate from the user's machine to other devices on the network.

To combat phishing malware, network applications traditionally have maintained reputation lists such as blacklists (lists of known malicious links) and whitelists (lists of known non-malicious links). Blacklists and whitelists are very difficult to keep up to date because of the virtually unlimited number of ways that a malicious link can be permuted. Attempts to overgeneralize blacklists, for example to top-level domain names, result in too many legitimate sites being blocked along with the malicious sites. Moreover, use of reputation lists is reactive rather than predictive in that previously unseen links, which will not appear on the reputation lists, cannot be diagnosed using the reputation lists. A malicious link may not be caught or a benign link may be unnecessarily blocked, as a result of these shortcomings of prior approaches.

Algorithmic remediation techniques have used BagOfWords to extract features from URLs and then used either Support Vector Machines (SVMs) or RandomForests to score the extracted features. Traditionally, BagOfWords is used to model most important words based on frequency of occurrence. Among other things, BagofWords cannot be used to model the order of occurrence of characters in URLs. Other approaches have created n-grams of the URL, but these approaches cannot be used to predict unseen sequences of characters, such as words that have not appeared in the training data used to build the model that is used to measure maliciousness. Also, n-gram based approaches require significant subject matter expertise in order to hand craft features that are good predictors of maliciousness. Such feature engineering is difficult and time-consuming, which makes it an expensive process.

Some academic research has proposed manually labeling parts of the URL to provide "position sensitivity." These approaches are labor-intensive and thus costly. Moreover, manual labeling may lack rigor and consistency, which then affects classification accuracy.

In this disclosure, technologies are described for addressing ongoing challenges of accurately and reliably discriminating malicious hyperlinks from those that are benign, including predictively handling previously unseen links. Embodiments of the disclosed technologies can be used at runtime to preemptively screen messages that contain links while maintaining the operational requirements of an electronic messaging system. Embodiments of the disclosed technologies can recognize patterns of syntactic and semantic features that are predictive of phishing algorithmically, for example without requiring different subparts of the link to be manually labeled.

In an embodiment, machine learning techniques are used to create models that learn to distinguish patterns of textual features of URLs that are predictive of phishing from those that are benign. Examples of textual features include but are not limited to syntactic and semantic features. In operation, the learned models produce output that is used to classify URLs that are extracted from electronic messages.

In an embodiment, the learned models are implemented using one or more artificial neural networks. As used herein, artificial neural network or just simply neural network may refer to a type of computing system that automatically learns how to classify new inputs based on examples that it has analyzed previously via, for example, a supervised machine learning process.

In an embodiment, an input layer of a neural network presents different patterns of textual features that have been extracted from a URL to one or more hidden layers. The hidden layers of the neural network perform clustering and classification of the patterns of textual features using a system of activation functions and weighted connections. The hidden layers present results of the clustering and classification to an output layer of the neural network. The output layer produces a final classification result using a thresholding technique. The final classification result is used for example by a network application, such as a message transfer application, to decide how to process the message from which the URL was extracted. For example, the final classification result may be used to block, redirect, or allow transmission of a message containing the URL, for example to prevent a phishing message from being transmitted to a downstream device or to allow a benign message to be transmitted to a downstream device.

In an embodiment, a computer parses an incoming URL into a set of ordered sequences of characters such as lexical units or substrings. For ease of discussion, sequences of characters, lexical units and/or substrings that result from a computer parsing of a URL may be referred to herein as unit-level inputs. In an embodiment, the computer parsing of the URL recognizes different semantic types within the URL and outputs unit-level inputs according to semantic type. For example, the parser output may include a domain name and a path name, where the domain name and the path name are substrings of the same URL.

In an embodiment, URLs are parsed into at least two different unit-level inputs. The unit-level inputs are separately classified using different neural networks, or different parts of a deep neural network, in accordance with their respective semantic types. For ease of discussion, reference to a neural network herein may refer to a neural network or one or more parts or layers of a neural network.

The output of the neural networks that independently analyze the unit-level inputs may be referred to herein as unit-level classification data. In an embodiment, there is a one-to-one correspondence between semantic types and neural networks, which results in a one-to-one correspondence between semantic types and unit-level classification data. For example, an embodiment may include at least two neural networks: a first neural network that is trained to recognize patterns of textual features in domain names and a second neural network that is trained to recognize patterns of textual features in path names.

In an embodiment, unit-level classification data output by the neural networks is combined with one or more context features that are associated with the URL. Context features include, for example, numeric features such as Autonomous System Numbers (ASNs), network addresses and/or geo-location data such as longitude and latitude measurements. The combination of textual features and context features is then classified by another neural network or neural network layer to produce the final classification result.

The configuration of machine learning technology that is described in this disclosure has been shown to significantly improve a computer's ability to detect phishing URLs. In particular, embodiments of the disclosed technologies have been effective in distinguishing malicious URLs from visually similar benign URLs.

Experimental results have shown an accuracy of 98% or higher in correctly classifying URLs as either benign or malicious. The accuracy of a model created using the disclosed approach has been validated with a benchmark data set that was unseen by the model.

While this disclosure describes the invention in the context of an electronic message application, aspects of the disclosed technologies are equally useful in other applications, such as any application that may benefit from machine learning-based classification of a URL, whether or not the URL is contained in a message. The disclosed technologies are applicable to any type of electronic file from which a URL can be extracted. For example, a search engine may display a URL in a set of search results responsive to a query. The search engine may incorporate aspects of the disclosed technologies to, for example, block transmission of the search results page to the user's computer if the page contains a malicious URL. Similarly, where a social media site may display digital content, such as a meme with an embedded URL, the meme may contain verbiage that is designed to entice the user to share the link with other uses of the social media platform. The social media site may incorporate aspects of the disclosed technologies to, for example, block the sharing of the content or strip the URL before allowing the share, based on the system's predicted maliciousness of the embedded link. Other embodiments, features and aspects will become apparent from the disclosure as a whole.

Link as used herein may refer to a Uniform Resource Locator (URL), or other text-based interactive mechanism that identifies a page on the World Wide Web. In an embodiment, a link serves both as a reference to a location of a web resource on a computer network and as a mechanism for retrieving the resource from that location. A link may comprise a string, which in turn may comprise a set of sub strings, such as but not limited to domain name, path name, or query string. As used herein, string or substring may refer to alphanumeric text, e.g., human-readable text as opposed to machine-readable code. A string or substring may comprise one or more lexical units. A lexical unit as used herein may refer to a sequence of characters, a chunk, a word, part of a word, or a sequence of words.

Throughout this disclosure, an element that is identified by a noun followed by the letter s in parentheses, as in (s), indicates that one or more of the element may be used in various embodiments.

Computing System Overview

FIG. 1 is a block diagram that depicts an example computing system 100. Computing system 100 is arranged to operate messaging interfaces 130, 132, message processing computer(s) 150, and link classification computer(s) 160, in the transmission of electronic messages from upstream computers to downstream computers. Examples of upstream and downstream computers include sender computers from which electronic messages may originate and recipient computers that may receive electronic messages. For example, computing devices 140, 142 may operate as upstream and/or downstream computers via an electronic communications network 120. Link classification computer(s) 160, computing devices 140, 142, and message processing computer(s) 150 are communicatively coupled to the electronic communications network 120 via for example wired, wireless, and/or optical connections. Display devices 170, 172 are communicatively coupled to computing devices 140, 142, respectively.

Implemented in the computing devices 110, 140, 142, 150 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1 as message pre-processor 162, link extraction instructions 164, model creation instructions 165, deep learning-based model(s) 166, link classification instructions 168, messaging interfaces 130, 132, and message transfer application 152, which are described in detail below.

"System" as used herein may refer to a single computer or network of computers and/or other devices. "Computer" or "computing device" as used herein may refer to a computer or any other electronic device that is equipped with a processor. "Processor" as used herein may refer to a software or hardware processor. "Instructions" or "application" as used herein may refer to one or more sets of computer program instructions; in all cases, elements of instructions are capable of computer execution or evaluation to generate output based upon a computer transformation of an input dataset into different digitally stored, electronic data.

"Model" as used herein may refer to one or more sets of computer program instructions and datasets that collectively define representations data, relationships between data or rules or transformations of other data. For example, a model is capable of computer execution or evaluation to generate output that indicates a probabilistic or statistical likelihood that an input or a set of inputs is associated with a particular class, category, type or other characterization.

Although computing system 100 may be implemented with any number of the described components, in this disclosure, these elements may be referred to in the singular form for ease of discussion. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In an embodiment, each of computing devices 140, 142 is a client-side computing device or set of cooperating computing devices, such as a smart phone, tablet computer, wearable or body-mounted device, smart appliance, laptop machine, or combination of any of such devices. In an embodiment, computer(s) 150, 160 are each a server-side computing device such as a server computer or a cluster or network of server computers accessible by the Internet, for example in a public or private cloud. As illustrated in FIG. 1, each of display devices 170, 172 is implemented as part of a computing device 140, 142, respectively, but may be implemented as a separate device or as part of another device, or as multiple networked display devices, in other implementations.

Messaging interfaces 130, 132 are each client-side messaging software such as a mail client or a messaging application, which reside in memory of computing devices 140, 142, respectively. Malware attacks and other security risks can occur during the transmission of messages or during the download of electronic content from the Internet. Thus, in some embodiments, a message may refer to an electronic file that is downloaded from network 120 to computing devices 140, 142 via messaging interfaces 130, 132. As such, messaging interfaces 130, 132 may be implemented as any type of client-side software applications that are configured to display visual content, such as web browsers, search engines, web-based applications, social media applications. Portions of messaging interfaces 130, 132 may be hosted by a hosting computer (not shown) on the network 120.

Figure 5:
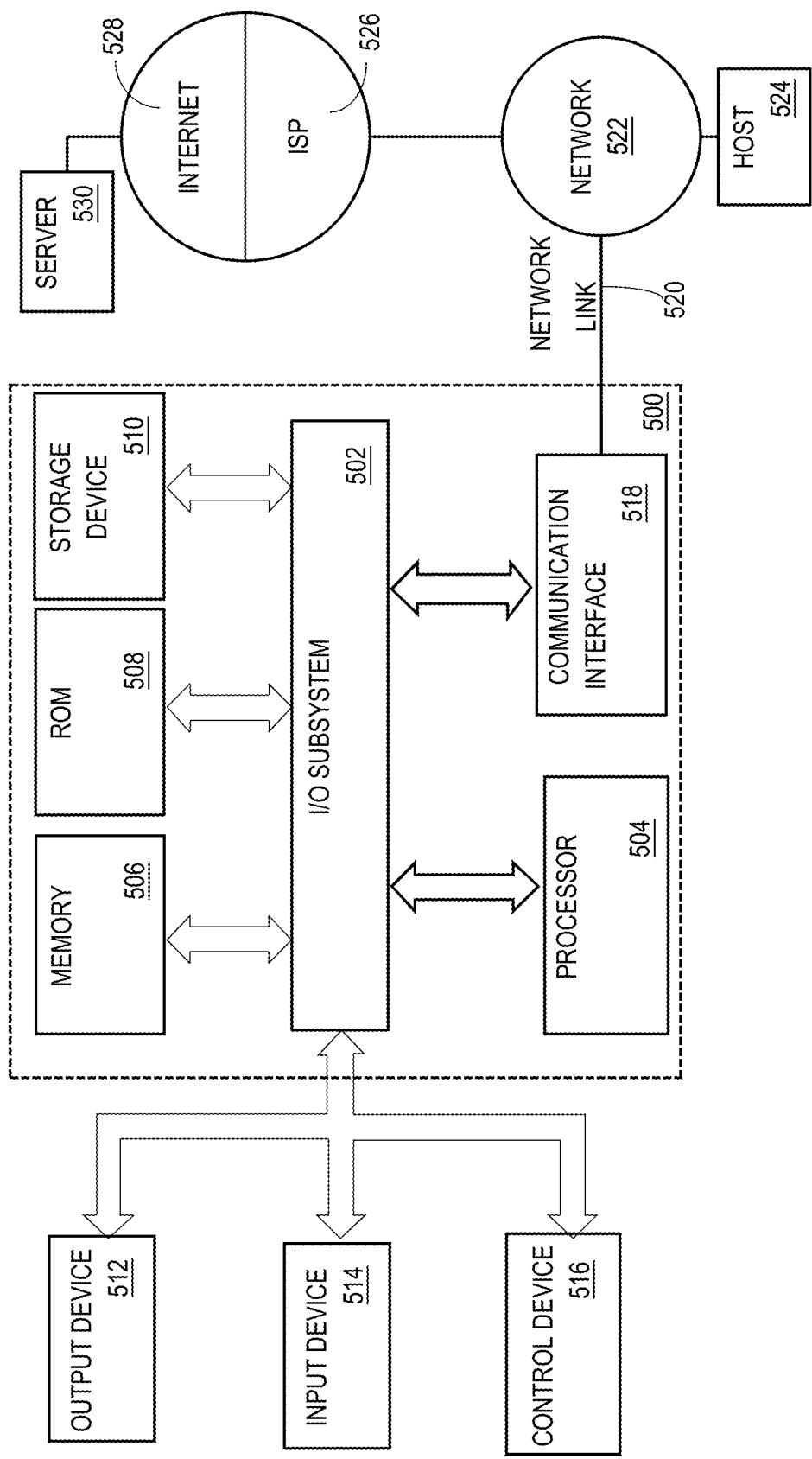
FIG. 5 is a block diagram that illustrates a computer system upon which an embodiment of the present invention may be implemented.

Messaging interfaces 130, 132 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices 110, 140, 142, 150 are shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142, 150.

Message Processing

Message processing computer(s) 150 operate message transfer application 152. Message transfer application 152 when executed by a processor controls the transmission of electronic communications between upstream computers and downstream computers, such as computing devices 140, 142, on network 120. Portions of message transfer application 152 may be implemented as or in combination with a text messaging service such as SMS (Short Message Service) or MMS (Multimedia Messaging Service), or as a Voice over Internet (VOIP) server or as a mail server of a public or private electronic mail or messaging system. Portions of message transfer application may be implemented in an online service, such as a social network service, in which electronic messages may include notifications, recommendations, shares, comments, news feeds, tweets, and/or connection requests. Message transfer application 152 may include various message scanning and filtering technologies, such as virus scanners, intrusion detection systems, and/or spam filters.

In an embodiment, message transfer application 152 employs stateless security scanning to scan messages as they are in transit from an upstream computer to one or more downstream computers. Messages may contain links in for example the subject line or the body of the message. Links may be embedded in other content that is contained in the message body or in an attachment. For example, a link may be embedded in an image that is attached to a message. A message may contain multiple links. In any case, when the message scanner detects a message that contains a link, the link, for example a URL, is processed by link classification computer(s) 160 as described below.

When a message contains multiple links, the disclosed technologies may be used to evaluate each link independently. In an embodiment, a message is classified as malicious as soon as one malicious link is found. In other embodiments, heuristic rules are used to determine whether to classify the entire message as malicious based on one malicious link or to continue evaluating other links contained in the message before the message is classified as malicious.

After one or more links are processed by link classification computer(s) 160, message transfer application 152 receives malware classification output from link classification computer(s) 160 and determines, based on the malware classification data, how to further process the message. For example, message transfer application 152 may determine to modify, delay, or block the message, or forward the message to a nexthop router or other downstream computer or element of network infrastructure gear. In an embodiment, message transfer application 152 executes a rule or set of rules to map the malware classification data output by link classification computer(s) 160 to an appropriate network instruction using, for example, a mapping table, and then causes the network instruction that corresponds to the malware classification data to be implemented on network 120. Implementation can be performed by a network device such as a mail server or a router executing the network instruction to drop the message, transmit configuration data to a firewall or router, reroute the message to a different machine, or allow the message to proceed to its intended destination.

The network instruction output by message transfer application 152 in response to malware classification data produced by link classification computer(s) 160 can include a network command to modify, delay, block, or forward a message to downstream routers, message transfer agents or other network nodes. An instruction to modify a message may include an instruction to remove a link from the message before sending the message downstream, or to re-direct or quarantine the message containing the link, for example by routing the message to a honeynet or quarantine services.

Message Pre-Processor

Message pre-processor 162 analyzes an electronic file, such as a message received from a message processing computer 150. If the message contains one or more links, message pre-processor 162 produces output data that contains the one or more links that are extracted from the message. Examples of software used by or as pre-processor 162 in some embodiments include open source libraries such as TIKA (available from The Apache Foundation), PyRTF (available on SourceForge from oubiwann and scusack), POI (available from The Apache Foundation), OLETOOLS (available on GitHub from Philippe Lagadec), or any open source or commercial software product that is capable of recognizing links.

Link Extraction

Link extraction instructions 164 when executed by a processor cause link classification computer(s) 160 to parse links that have been extracted from messages by message pre-processor 162 into unit-level inputs such as substrings or lexical units, according to semantic type. In an embodiment, link extraction instructions 164 use a grammar to recognize and extract semantic types that are contained within a URL, for example domain name, path name, query string, etc. In an embodiment, the grammar is implemented as computer instructions that encode syntactic and/or semantic rules for URLs, such as the RFC 1738 URL Protocol and/or the RFC 3986 Generic Syntax for Uniform Resource Identifiers (URIs). Link extraction instructions 164 output unit-level inputs that are analyzed by link classification instructions 168 via deep learning-based model(s) 166.

In an embodiment, link extraction instructions 164 use domain name data that it extracts from a link to obtain context data associated with the link. For example, the extracted domain name data may be used as a query term to look up ASN data, network address data, and/or geo-location data associated with the domain name. To do this, link extraction instructions 164 may run a query on a publicly available directory on the Internet, such as WHOIS.

Model Creation

In an embodiment, link classification computer(s) 160 include one or more deep learning-based models 166. For example, link classification computer(s) 160 may include multiple individual models 166, where each model 166 has been trained separately to recognize patterns of syntactic and semantic features that are associated with a particular semantic type. For example, models 166 may include two models, where one model is trained to recognize patterns of semantic and syntactic features that constitute malware signals in domain names of URLs and the other model is trained to recognize patterns of semantic and syntactic features that constitute malware signals in path names of URLs. Alternatively or in addition, link classification computer(s) 160 may include one or more generalized models that are trained to recognize malware signals that are common across multiple different semantic types or across entire URLs.

Deep learning-based model(s) 166 are created by model creation instructions 165 processing training data using machine learning algorithm(s). In various embodiments, deep learning-based model(s) 166 are created using as training data parser output that has been previously produced by link extraction instructions 164. A particular training data set includes link data that is representative of one or more semantic types. For example, training data for a model 166 to classify domain names includes domain name data while training data for another model 166 to classify path names includes path name data, where the domain name data and path name data both have been extracted from link data.

In an embodiment, training data includes examples of both malicious URLs and benign URLs that have been collected with permission from various sources, such as publicly available reputation lists and/or other sources. In an embodiment, the ratio of positive (malicious) training examples to negative (benign) training examples is in the range of about 1:1, that is, about half of the training examples are malicious and about half of the training examples are benign. The particular configuration of the training data may vary according to the requirements of a particular system design or implementation. In an embodiment, training data includes URL examples that are evaluated during online use of the system. That is, in an embodiment, the model(s) are updated as new URL examples are processed by an online system.

In general, data sets used to train deep learning-based model(s) 166 include both positive and negative examples. In some embodiments, the ratio of malicious documents to benign documents is less than 1, meaning the training data set contains more benign documents than malicious documents. In other embodiments, the ratio of malicious documents to benign documents is equal to 1, meaning that the training data set contains equal numbers of malicious and benign documents. In still other embodiments, the ratio of malicious documents to benign documents is greater to 1, meaning that the training data set contains more malicious than benign documents.

In various embodiments, the deep learning-based model(s) 166 each are created by evaluating training data using a convolutional neural network (CNN), for example, a one-dimensional CNN. The particular type of machine learning algorithm that is used to implement the neural network may vary depending on the characteristics of the input data and/or other factors. Examples of machine learning algorithms that may be used include but are not limited to a rectified linear unit (ReLu) function, a sigmoid function, a tanh function, a Maxout function, or another type of mathematical function that can perform a nonlinear transformation over input data. "Algorithm" as used herein may refer to a set of computer instructions in which steps of a mathematical algorithm are implemented.

Link Classification

In an embodiment, link classification instructions 168 and deep learning-based model(s) 166 are collectively referred to as a machine learning-based classifier. Embodiments of link classification computer(s) 160 include a single classifier or multiple classifiers. Link classification instructions 168 provide the data produced by link extraction instructions 164 to machine learning based models 166, which produce the malware classification data as described herein. Link classification instructions 168 expose or otherwise make available the malware classification data for use by message processing computer(s) 150 and message transfer application 152 using, for example, an application program interface (API).

Example Messaging System Architecture

Figure 2:
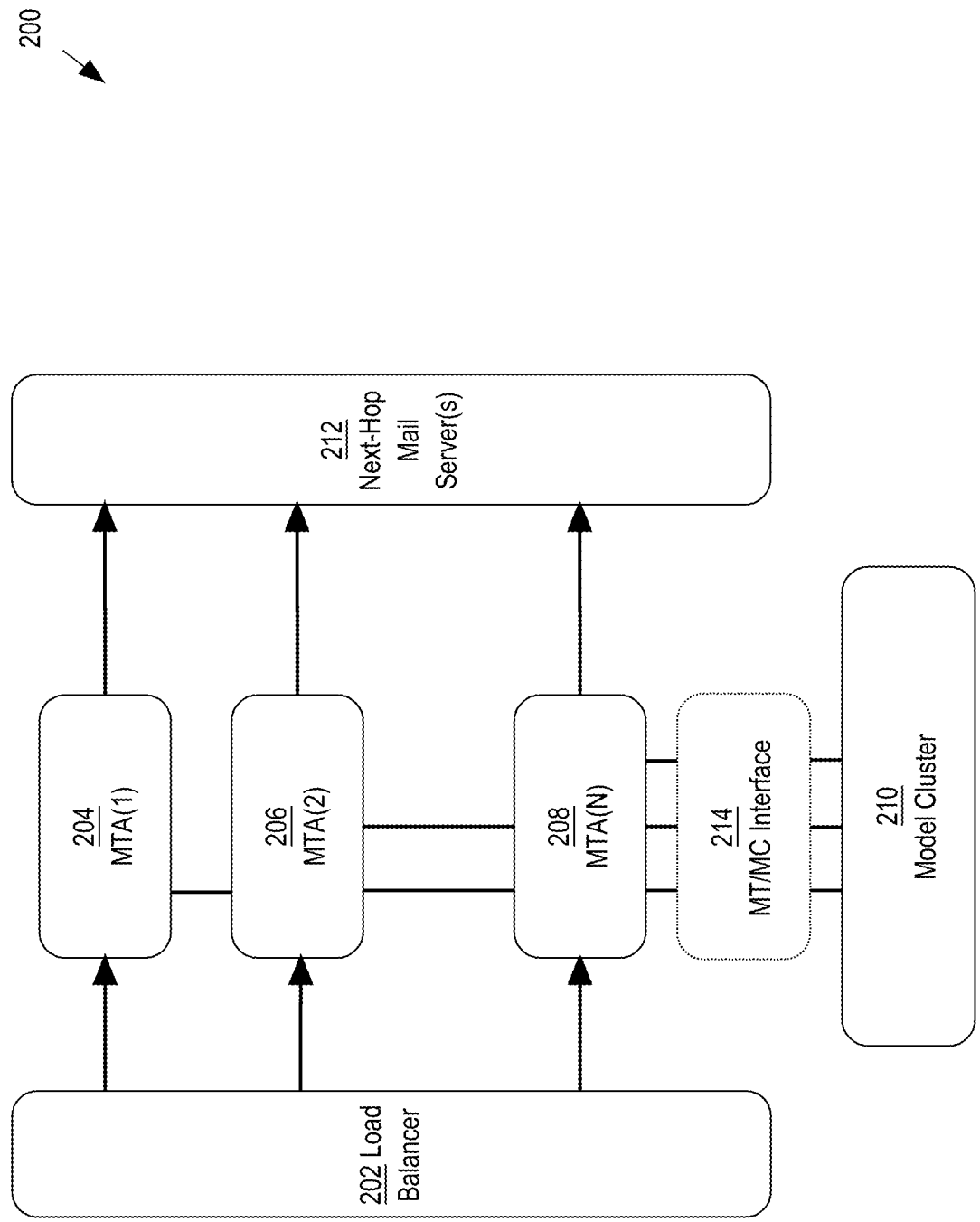
FIG. 2 is a schematic depiction of a portion of the computing system of FIG. 1, in an embodiment.

FIG. 2 illustrates an embodiment of a system architecture in which aspects of the disclosed technologies may be implemented. A network 200 includes network devices 202, 212. Network device 202 is illustratively a load balancer while network device 212 is a next-hop server such as a mail server.

Any number N of message transfer applications (also called agents) (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 performs stateless security scanning of messages received from network device 202 and prior to transmission of the messages to network device 212.

In an embodiment, MT/MC interface 214 is interposed between the MTAs 204, 206, 208 and a model cluster 210. However, portions of MT/MC interface 214 may be implemented within an MTA 204, 206, 208.

Model cluster 210 may be implemented on link classification computer(s) 160 and include one or more deep learning-based model(s) 166 that may be selectively engaged and disengaged by MT/MC interface 214 for use in connection with the stateless scanning performed by the MTAs 204, 206, 208. In an embodiment, model cluster 210 includes deep learning-based model(s) 166 for many different document types, such as any one or more of the document types discussed herein. In an embodiment, the link classification computer(s) 160 used to host model cluster 210 are stateless model servers.

Message processing/message classification (MT/MC) interface 214 when executed by a processor controls the selective engagement of link classification computer(s) 160 by message processing computer(s) 150 in tasks performed by, or requested by, message transfer application 152. MT/MC interface 214 manages and facilitates electronic communications of data and instructions between message processing computer(s) 150 and link classification computer(s) 160 during the handling by message transfer application 152 of electronic messages and their respective links, for example messages that are being transmitted from computing device 140 to computing device 142, or from computing device 142 to computing device 140, over network 120. MT/MC interface 214 is shown as a separate component in FIG. 2 but all or portions of MT/MC interface 214 may be implemented as part of message transfer application 152. Alternatively, or in addition, some portions of MT/MC interface 214 may be implemented on link classification computer(s) 160.

In an embodiment, MT/MC interface 214 includes at least message pre-processor 162, link extraction instructions 164, message classification instruction(s) 166. In executing one or more of message pre-processor 162, link extraction instructions 164, message classification instruction(s) 166, MT/MC interface 214 accesses and utilizes data and instructions stored in deep learning-based model(s) 166 as described herein.

Message Classification Process

Figure 3:
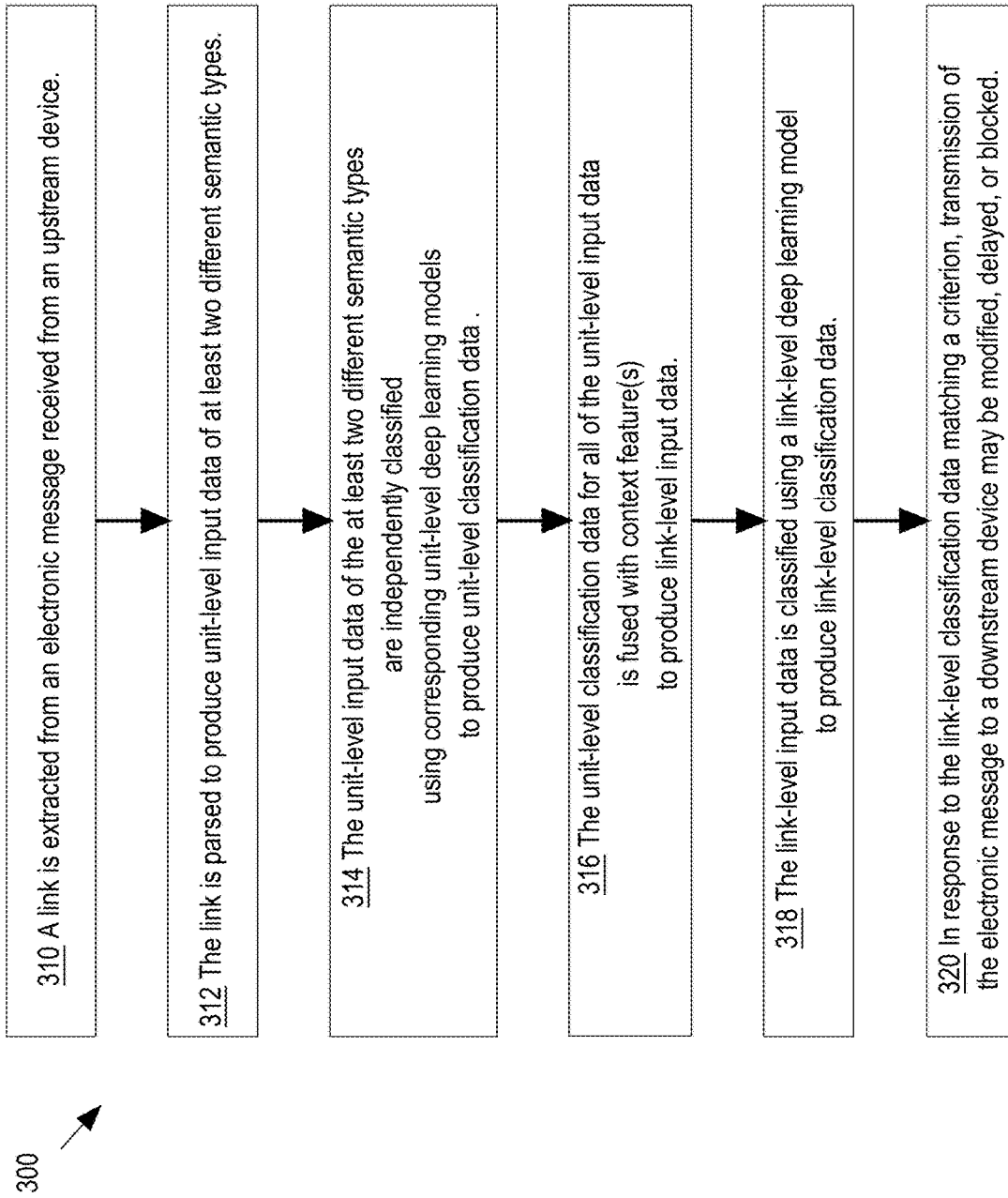
FIG. 3 is a flow diagram that depicts a process, in an embodiment.

In an embodiment, the above-described technologies are used to automatically and proactively scan electronic messages prior to transmission of the messages to a downstream computer. To that end, FIG. 3 illustrates a process that can be performed by computing system 100. FIG. 3 is a flow diagram that depicts a process 300 for incorporating machine learning technologies into a message scanning process, in an embodiment. Process 300 may be performed by a single entity or program or by multiple entities or programs, including, for example, a client-side mail or messaging application and a server. The operations of the process as shown in FIG. 3 can be implemented using processor-executable instructions that are stored in computer memory. For purposes of providing a clear example, the operations of FIG. 3 are described as performed by one or more computing device(s) 110, 140, 142, 150, 160, which may be individually or collectively referred to as simply 'computing system 100.' Also for clarity, the operations of FIG. 3 are described as evaluating a single link. It should be understood, however, that process 300 can be used to evaluate any number of links.

In operation 310, process 300 extracts a link from an electronic file received from an upstream device. In an embodiment, the electronic file includes a message that has been received from a message transfer application on a network. In other embodiments, the electronic file includes a web page or another type of document. In an embodiment, to extract the link, process 300 converts the message text to a string or a CSV file, and then searches the text for a regular expression that matches the expected format of the link.

In operation 312, the link extracted in operation 310 is parsed to produce unit-level input data of at least two different semantic types. In an embodiment, the unit-level input data includes first unit-level input data of a first semantic type and second unit-level input data of a second semantic type. In an embodiment, a grammar is used to identify, in the link, a first sequence of characters that corresponds to at least a portion of a domain name. Operation 312 outputs the first sequence of characters as the first unit-level input data. The grammar is also used to identify, in the link, a sequence of characters that corresponds to at least a portion of a path name. Operation 312 outputs the second sequence of characters as the second unit-level input data.

In operation 314, the unit-level input data of the at least two different semantic types, output by operation 312, are independently classified using corresponding unit-level deep learning models to produce unit-level classification data. In an embodiment, the first and second unit-level input data produced by operation 312 are inputted into first and second deep learning models, respectively. The first and second deep learning models evaluate the first and second unit-level input data, respectively, and output first and second unit-level classification data, respectively.

In comparison to manual labeling approaches, the disclosed models do not rely on manual labels but rather derive and learn syntactic and semantic features of URLs from training data, algorithmically. For example, the first deep learning model may learn from the training data that a domain name followed by a hashtag has a higher risk of being malicious than the same domain name that is followed by a forward slash ("/"). As another example, the second deep learning model may learn from the training data that a path name that is preceded by bait text such as a brand name has a higher risk of being malicious than the same path name that is not preceded by a brand name. To do this, the deep learning model(s) may evaluate substrings of the unit-level input data independently; for example, unit-level input data may be divided into a prefix portion and a suffix portion, and the prefix and suffix portions may be evaluated independently using the same model or different models, in some embodiments.

In an embodiment, the first deep learning model has been trained to recognize, in unit-level data of the first semantic type, patterns of syntactic features and semantic features that are predictive of phishing and the second deep learning model has been trained to recognize, in unit-level data of the second semantic type, patterns of syntactic features and semantic features that are predictive of phishing.

As used herein, a syntactic feature may refer to a characteristic of the syntax of an input. For example, a syntactic feature may provide information relating to the order of characters in the unit-level data; such as whether a sequence of characters is part of a top-level domain name, a subdomain, a path, a filename, or a query string of a URL.

As used herein, a semantic feature may refer to a meaning of a word or phrase of an input. For example, a semantic feature of a domain name may provide information relating to the type or category of web sites to which the domain name belongs; such as whether the domain name represents a brand name or a commercial web site or the particular type of commercial web site. For instance, on encountering the word "visa" in a domain name, the system may generate a feature that indicates a likelihood that the domain name includes a brand name.

In an embodiment, the first and second deep learning models have been trained to classify different sequences of bait text and non-bait text and separators differently. An example of two different sequences of bait text and non-bait text and separators is shown in Table 1 below. Alternatively or in addition, the first and second deep learning models have been trained to classify sequences of characters that include bait text that is predictive of phishing differently than sequences of characters that do not include bait text. Illustrative, non-limiting examples of different sequences of characters that include bait text and non-bait text and separators are shown in Table 1 below.

TABLE 1

| Unit-Level Input Data Examples. | |
| --- | --- |
| Domain | Path |
| Ghanaembassydc.org | visas |
| www.visainternational.com | |
| Azurehospitality.co | |
| Cloudnetwork1.azurewebsites | E!m~ma/ Html#### |
| Visasabroad.com | Jz/a/a/onedrive |

In Table 1, examples of bait text are shown in bold, and non-bait text is shown in regular font. Examples of separators include periods and forward slash ("/"). Bait text that occurs in the domain name has different syntactic features than bait text that occurs in the path name. Moreover, bait text that occurs in different positions of the domain name or path name may have different syntactic features that indicate its order of occurrence in the domain name or path name, as the case may be.

Bait text that occurs without any other characters in a domain name or a path name may have different semantic features than bait text that occurs in combination with other characters; for example "visasabroad" is likely to generate different semantic features than "visas." Bait text that occurs in combination with different characters in different inputs likely generate different semantic features. For example, "visainternational" in a domain name is likely to generate different semantic features than "visasabroad" in a domain name.

The use of a combination of syntactic and semantic features enables the system to evaluate the likely phishiness of an input taking into account both semantic meaning and order of occurrence of bait text relative to non-bait text via algorithmically determined syntactic features. For example, if, for a given link, the bait text "visas" occurs in the path name in combination with a known whitelisted domain name such as ghanaembassydc.org, the link may be assigned a lower phishiness score, indicating that the link is likely benign. On the other hand, if the bait text "visas" occurs in the domain name in combination with a suspicious path name such as Jz/a/a/onedrive, the link may be assigned a higher phishiness score, indicating that the link is likely a phishing attempt. As used herein, phishiness may refer to a computer-generated prediction that a link is malicious rather than benign, for example, a likelihood that clicking on the link will initiate a phishing attempt.

Factors that the system may use to adjust the phishiness scores lower or higher are learned by the models via the training data and include but are not limited to the length of the path name, the length of the domain name, the number of separators in the path name, the number of separators in the domain name, whether a sequence of characters is found on a reputation list. These and/or other factors may be learned and used by the system alone or in combination to adjust the weighted connections in the neural network. These weights are not pre-programmed, rather they are determined and adjusted by the neural network as it learns patterns of textual features that are indicative of phishing, based on the training examples and/or other inputs that the neural network has evaluated previously.

In an embodiment, each of the unit-level classification data generated by operation 314 includes a numerical score, such as a probabilistic value in the range of 0 and 1, where a higher score indicates a greater likelihood that the corresponding unit-level input data indicates a phishing attempt.

In operation 316, the unit-level classification data for all of the unit-level input data is fused with context feature(s) to produce link-level input data. In an embodiment, operation 316 combines the first and second unit-level classification data produced by operation 314 with at least one numeric feature that has been extracted from context data to produce the link-level input data.

In an embodiment, the context data is obtained using a domain name extracted from the link in operation 312. The domain name is used as a query term to lookup Autonomous System Number (ASN) data associated with the domain name in, for example, a publicly available searchable database on the Internet. The ASN data includes one or more numeric features such as network addresses.

In an embodiment, the domain name is used to determine geo-location data associated with the domain name, and the geo-location data is used as a numeric feature. For example, geo-location data includes longitude and latitude measurements associated with the ASN data, in an embodiment, and the longitude and latitude measurements are used to evaluate the phishiness of the link.

In an embodiment, operation 316 creates the link-level input data by concatenating the first unit-level classification data and the second unit-level classification data, output by operation 314, and the numeric features, e.g., ASN data and geo-location data.

In operation 318, the link-level input data produced by operation 316 is classified using a link-level deep learning model to produce link-level classification data. In an embodiment, the link-level input data is inputted into a third deep learning model, which outputs the link-level classification data. In an embodiment, the third deep learning model has been trained to recognize patterns that include combinations of syntactic features and semantic features and numeric features, which are predictive of phishing. In an embodiment, the link-level classification data generated by operation 318 includes a numerical score, such as a probabilistic value in the range of 0 and 1, where a higher score indicates a greater likelihood that the link-level input data indicates a phishing attempt. Examples of link-level classification data and corresponding link-level input data are shown in Table 2 below.

more computing device(s) 110, 140, 142, 150, 160, which may be individually or collectively referred to as simply 'computing system 100.'

Process 400 receives N units of unit-level input data, where N is a positive integer. Each of the N units has been extracted from a URL that in turn has been extracted from an electronic file, such as a message. Different units may be associated with different semantic types. For example, unit-level input data (1) may be a domain name and unit-level input data (N) may be a path name or a query string.

Operations 402 and 404 represent an embedding layer of a convolutional neural network (CNN). Operations 402 and 404 project unit-level input data(1) and unit-level input data(N), respectively, into vector space. As a result, sequences of characters of each of the unit-level input data are mapped to a high-dimensional vector.

The embedding layer clusters together patterns of input data that are syntactically and/or semantically similar to each other and encodes them similarly. For example, domain names of "visasinternational" and "visasabroad" might be embedded near each other in vector space; on the other hand a path name that includes "onedrive" might be embedded in a different part of the vector space than a path name that includes "visas." As another example, domain names of banking sites might be embedded near each other in the vector space even if the domain names are not visually similar. For instance, chase and bankofamerica may be embedded near each other in the vector space because they are both associated with the semantic category of financial institutions. Embedding weights used by operations 402 and

TABLE 1

Unit-Level Input Data Examples.

| Domain(1) | Domain(2) | Ext | Path(1) | Path(2) | Path(3) | Path(4) | Path(5) | Score |
|---|---|---|---|---|---|---|---|---|
| Ghanaembassydc |  | Org | visas |  |  |  |  | 0.00014 |
| www.visasinternational |  | com.za |  |  |  |  |  | 0.066 |
| azurehospitality |  | Co.ke |  |  |  |  |  | 0.93 |
| Cloudnetwork1 | azurewebsites | net | E!m~ma | Html### |  |  |  | 0.99 |
| Visasabroad |  | com | jz | a | a | 1 | onedrive | 1.0 |

In operation 320, in response to the link-level classification data matching a criterion, transmission of the electronic message from which the link was extracted in operation 310 to a downstream device may be approved, modified, delayed, or blocked. Examples of criteria that may be used to determine whether to cause the network to act on the link-level classification data include a threshold confidence value and a threshold voting score. For instance, if a voting score or a confidence value produced by the machine learning-based classifier exceeds the respective threshold values, process 300 causes the network to act on the malware classification data, in an embodiment.

Example Neural Network Implementation

Figure 4:
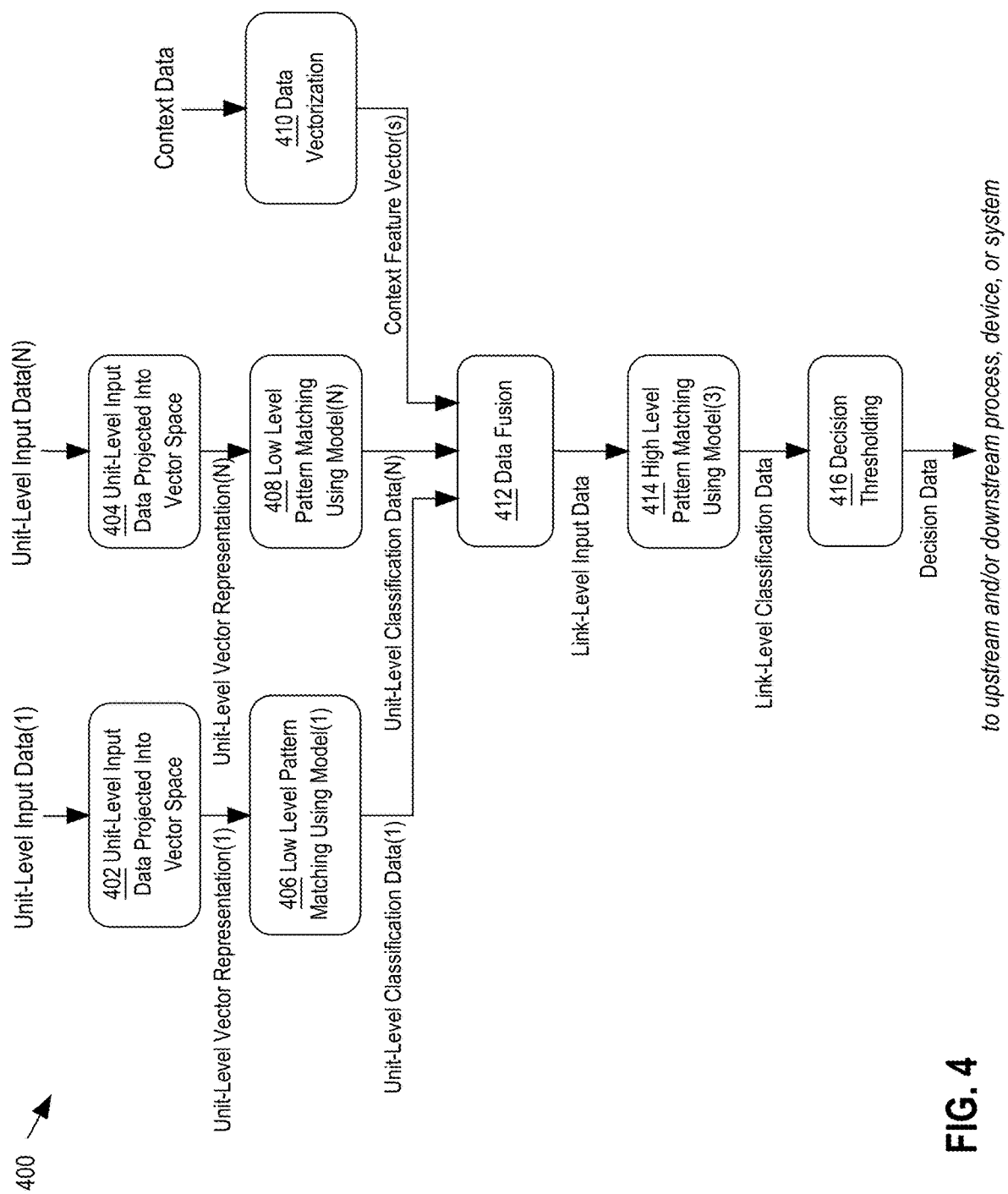
FIG. 4 is a flow diagram that depicts a process, in an embodiment.

FIG. 4 is a flow diagram that depicts a process 400 for classifying links using machine learning technologies, in an embodiment. Process 400 may be performed by a single entity or program or by multiple entities or programs, including, for example, a network service that performs link classification, which may be accessed or called by an electronic mail or messaging application. The operations of the process as shown in FIG. 4 can be implemented using processor-executable instructions that are stored in computer memory. For purposes of providing a clear example, the operations of FIG. 4 are described as performed by one or 404 are determined algorithmically by the neural network and are adjusted dynamically based on training data and subsequent classifications of new examples. Operations 402 and 404 output unit-level vector representation(1) and unit-level vector representation(N), respectively.

Operations 406 and 408 represent a convolution layer of the CNN that performs low level pattern matching on the unit-level vector representations (1), (N) using model (1) and model(N) respectively, where model(1) and model(N) have been trained to recognize patterns of syntactic and semantic features contained in the vector representations (1), (N) of the unit-level input data (1), (N), respectively. In an embodiment, operations 406 and 408 each perform a one-dimensional convolution that scans all the dimensions of the vector representation(1), (N), respectively, for patterns of characters that are useful for making phish detections.

In effect, the convolution layer operates like sliding a window that slides over the embedding vectors and finds meaningful patterns, such as phrase or word patterns in the URL domains or URL paths or query strings that have been learned by the neural network via the training examples to be predictive of phishing. Operations 406, 408 output unit-level classification data(1), (N), respectively, which, in an embodiment, include unit-level "phishiness" scores such as probabilistic values, for various patterns of textual features, where a higher score indicates a higher probability that the pattern of features is predictive of phishing.

In operation 410, context data associated with the link being analyzed is vectorized. The context data input to operation 410 includes, for example, ASN, latitude and longitude.

In an embodiment, operation 410 maps each piece of context data to a sparse vector. For example, a single vector is assigned to each ASN, latitude, and longitude found to be associated with the link being analyzed. For instance, if the system determines that there are three ASNs associated with the top level domain name contained in the link being analyzed, the ASNs may be converted to a three-dimensional vector: $[ASN_1, ASN_2, ASN_3]$. Other embodiments may include an embedding layer for the context data but an embedding layer is not required. Operation 410 outputs context feature vector(s).

In operation 412, unit-level classification data(1), (N) and context feature vector(s) are combined into a single vector to produce link-level input data. In an embodiment, combining or fusing the textual and numeric features involves a simple concatenation of the unit-level classification data(1), (N) and context feature vector(s) to produce a single, larger vector which is output as link-level input data.

In operation 414, high level pattern matching is performed by applying model(3) to the link-level input data produced by operation 412. Model(3) has been trained on training examples of link-level data; that is, patterns of textual features and numeric context features. In an embodiment, operation 414 evaluates the combinations of the output of the one-dimensional convolutions performed by operations 406 and 408 (both for domains and URL paths and parameters, for example) and the associated context vector output by operation 410 (which includes individual ASN or latitude or longitude data associated with a link), and looks for patterns among all of these inputs in combination.

Operation 416, decision thresholding, represents a single neuron that produces decision data that represents all of the prior data as a single score, the final classification result for the link being analyzed. In an embodiment, the decision data is a numeric value, for example, on a scale of 1 to 100, a score of 100 indicates that the link is very likely a phishing attempt while a score of 1 indicates that the link is very unlikely to be a phishing attempt. In an embodiment, the decision data is compared to a threshold criterion, such that further action is only taken if the decision data meets or exceeds the threshold criterion. The decision data produced by operation 416 is output or exposed for use by one or more upstream and/or downstream processes, devices, or systems. For example, the decision data may be used to control the transmission of electronic files, such as messages, on a network. The decision data also may feed back and adjust the weighted connections in the previous layers of the neural network.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method includes: extracting, from a link contained in an electronic message received from an upstream device on a network, first unit-level input data of a first semantic type and second unit-level input data of a second semantic type; in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing; combining the first and second unit-level classification data with at least one numeric feature that has been extracted from context data to produce link-level input data; in response to inputting the link-level input data into a third deep learning model, outputting, by the third deep learning model, link-level classification data, the third deep learning model having been trained to recognize patterns of syntactic features and semantic features and numeric features that are predictive of phishing; in response to the link-level classification data matching a criterion, causing the network to modify, delay, or block transmission of the electronic message to a downstream device.

An example 2 includes the subject matter of example 1, further including performing the extracting of the first unit-level input data using a grammar to identify a sequence of characters in the link that corresponds to at least one domain name. An example 3 includes the subject matter of example 1 or example 2, further including performing the extracting of the second unit-level input data using a grammar to identify a sequence of characters in the link that corresponds to at least one path name. An example 4 includes the subject matter of example 2, further including using the at least one domain name to determine Autonomous System Number (ASN) data associated with the domain name and using at least some of the ASN data as the at least one numeric feature. An example 5 includes the subject matter of example 4, further including using the at least one domain name to determine geo-location data associated with the at least one domain name and using the geo-location data as the at least one numeric feature. An example 6 includes the subject matter of example 5, further including creating the link-level input data by concatenating the first unit-level classification data and the second unit-level classification data and the ASN data and the geo-location data. An example 7 includes the subject matter of any of examples 1-6, the first and second deep learning models having been trained to classify sequences of characters that include bait text that is predictive of phishing differently than sequences of characters that do not include the bait text. An example 8 includes the subject matter of any of examples 1-7, the first and second deep learning models having been trained to classify different sequences of bait text and non-bait text and separators differently. An example 9 includes the subject matter of any of examples 1-8, the first and second and third deep learning models including artificial convolutional neural networks or layers of an artificial convolutional neural network. An example 10 includes the subject matter of any of examples 1-9, further including receiving the electronic message from a message transfer application on the network.

In an example 11, an apparatus includes: one or more non-transitory computer-readable storage media including instructions which, when executed by one or more processors, cause the one or more processors to perform operations including: extracting, from a link contained in an electronic message received from an upstream device on a network, first unit-level input data of a first semantic type and second unit-level input data of a second semantic type; in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing; combining the first and second unit-level classification data with at least one numeric feature that has been extracted from context data to produce link-level input data; in response to inputting the link-level input data into a third deep learning model, outputting, by the third deep learning model, link-level classification data, the third deep learning model having been trained to recognize patterns of syntactic features and semantic features and numeric features that are predictive of phishing; in response to the link-level classification data matching a criterion, causing the network to modify, delay, or block transmission of the electronic message to a downstream device.

An example 12 includes the subject matter of example 11, where the instructions, when executed by one or more processors, cause the one or more processors to perform operations including performing the extracting of the first unit-level input data using a grammar to identify a sequence of characters in the link that corresponds to at least one domain name. An example 13 includes the subject matter of example 11 or example 12, where the instructions, when executed by one or more processors, cause the one or more processors to perform operations including performing the extracting of the second unit-level input data using a grammar to identify a sequence of characters in the link that corresponds to at least one path name. An example 14 includes the subject matter of example 12, where the instructions, when executed by one or more processors, cause the one or more processors to perform operations including using the at least one domain name to determine Autonomous System Number (ASN) data associated with the domain name and using at least some of the ASN data as the at least one numeric feature. An example 15 includes the subject matter of example 14, where the instructions, when executed by one or more processors, cause the one or more processors to perform operations including using the at least one domain name to determine geo-location data associated with the at least one domain name and using the geo-location data as the at least one numeric feature. An example 16 includes the subject matter of example 15, where the instructions, when executed by one or more processors, cause the one or more processors to perform operations including creating the link-level input data by concatenating the first unit-level classification data and the second unit-level classification data and the ASN data and the geo-location data. An example 17 includes the subject matter of any of examples 11-16, the first and second deep learning models having been trained to classify sequences of characters that include bait text that is predictive of phishing differently than sequences of characters that do not include the bait text. An example 18 includes the subject matter of any of examples 11-17, the first and second deep learning models having been trained to classify different sequences of bait text and non-bait text and separators differently. An example 19 includes the subject matter of any of examples 11-18, the first and second and third deep learning models including artificial convolutional neural networks or layers of an artificial convolutional neural network. An example 20 includes the subject matter of any of examples 11-16, where the instructions, when executed by one or more processors, cause the one or more processors to perform operations including receiving the electronic message from a message transfer application on the network.

In an example 21, a system includes: one or more processors; one or more storage media storing instructions which, when executed by the one or more processors, cause: extracting, from a link contained in an electronic message received from an upstream device on a network, first unit-level input data of a first semantic type and second unit-level input data of a second semantic type; in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing; combining the first and second unit-level classification data with at least one numeric feature that has been extracted from context data to produce link-level input data; in response to inputting the link-level input data into a third deep learning model, outputting, by the third deep learning model, link-level classification data, the third deep learning model having been trained to recognize patterns of syntactic features and semantic features and numeric features that are predictive of phishing; in response to the link-level classification data matching a criterion, causing the network to modify, delay, or block transmission of the electronic message to a downstream device.

An example 22 includes the subject matter of example 21, wherein the instructions, when executed by one or more processors, cause the one or more processors to perform operations comprising performing the extracting of the first unit-level input data using a grammar to identify a sequence of characters in the link that corresponds to at least one domain name. An example 23 includes the subject matter of example 21 or example 22, wherein the instructions, when executed by one or more processors, cause the one or more processors to perform operations comprising performing the extracting of the second unit-level input data using a grammar to identify a sequence of characters in the link that corresponds to at least one path name. An example 24 includes the subject matter of example 22, wherein the instructions, when executed by one or more processors, cause the one or more processors to perform operations comprising using the at least one domain name to determine Autonomous System Number (ASN) data associated with the domain name and using at least some of the ASN data as the at least one numeric feature. An example 25 includes the subject matter of example 24, wherein the instructions, when executed by one or more processors, cause the one or more processors to perform operations comprising using the at least one domain name to determine geo-location data associated with the at least one domain name and using the geo-location data as the at least one numeric feature. An example 26 includes the subject matter of example 25, wherein the instructions, when executed by one or more processors, cause the one or more processors to perform operations comprising creating the link-level input data by concatenating the first unit-level classification data and the second unit-level classification data and the ASN data and the geo-location data. An example 27 includes the subject matter of any of examples 21-26, the first and second deep learning models having been trained to classify sequences of characters that include bait text that is predictive of phishing differently than sequences of characters that do not include the bait text. An example 28 includes the subject matter of any of examples 21-27, the first and second deep learning models having been trained to classify different sequences of bait text and non-bait text and separators differently. An example 29 includes the subject matter of any of examples 21-28, the first and second and third deep learning models comprising artificial convolutional neural networks or layers of an artificial convolutional neural network. An example 30 includes the subject matter of any of examples 21-29, wherein the instructions, when executed by one or more processors, cause the one or more processors to perform operations comprising receiving the electronic message from a message transfer application on the network.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   extracting, from a link contained in an electronic message received from an upstream device on a network, first unit-level input data of a first semantic type and second unit-level input data of a second semantic type;
   in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing;
   combining the first and second unit-level classification data with at least one numeric feature that has been extracted from context data to produce link-level input data;
   in response to inputting the link-level input data into a third deep learning model, outputting, by the third deep learning model, link-level classification data, the third deep learning model having been trained to recognize patterns of syntactic features and semantic features and numeric features that are predictive of phishing;
   in response to the link-level classification data matching a criterion, causing the network to modify, delay, or block transmission of the electronic message to a downstream device.

2. The method of claim 1, further comprising performing the extracting of the first unit-level input data using a grammar to identify a sequence of characters in the link that corresponds to at least one domain name.

3. The method of claim 1, further comprising performing the extracting of the second unit-level input data using a grammar to identify a sequence of characters in the link that corresponds to at least one path name.

4. The method of claim 2, further comprising using the at least one domain name to determine Autonomous System Number (ASN) data associated with the domain name and using at least some of the ASN data as the at least one numeric feature.

5. The method of claim 4, further comprising using the at least one domain name to determine geo-location data associated with the at least one domain name and using the geo-location data as the at least one numeric feature.

6. The method of claim 5, further comprising creating the link-level input data by concatenating the first unit-level classification data and the second unit-level classification data and the ASN data and the geo-location data.

7. The method of claim 1, the first and second deep learning models having been trained to classify sequences of characters that include bait text that is predictive of phishing differently than sequences of characters that do not include the bait text.

8. The method of claim 1, the first and second deep learning models having been trained to classify different sequences of bait text and non-bait text and separators differently.

9. The method of claim 1, the first and second and third deep learning models comprising artificial convolutional neural networks or layers of an artificial convolutional neural network.

10. The method of claim 1, further comprising receiving the electronic message from a message transfer application on the network.

11. An apparatus comprising:
    one or more non-transitory computer-readable storage media comprising instructions which, when executed by one or more processors, cause the one or more processors to perform operations comprising:
    extracting, from a link contained in an electronic message received from an upstream device on a network, first unit-level input data of a first semantic type and second unit-level input data of a second semantic type;
    in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing;
    combining the first and second unit-level classification data with at least one numeric feature that has been extracted from context data to produce link-level input data;
    in response to inputting the link-level input data into a third deep learning model, outputting, by the third deep learning model, link-level classification data, the third deep learning model having been trained to recognize patterns of syntactic features and semantic features and numeric features that are predictive of phishing;

in response to the link-level classification data matching a criterion, causing the network to modify, delay, or block transmission of the electronic message to a downstream device.

12. The apparatus of claim 11, wherein the instructions, when executed by one or more processors, cause the one or more processors to perform operations comprising performing the extracting of the first unit-level input data using a grammar to identify a sequence of characters in the link that corresponds to at least one domain name.

13. The apparatus of claim 11, wherein the instructions, when executed by one or more processors, cause the one or more processors to perform operations comprising performing the extracting of the second unit-level input data using a grammar to identify a sequence of characters in the link that corresponds to at least one path name.

14. The apparatus of claim 12, wherein the instructions, when executed by one or more processors, cause the one or more processors to perform operations comprising using the at least one domain name to determine Autonomous System Number (ASN) data associated with the domain name and using at least some of the ASN data as the at least one numeric feature.

15. The apparatus of claim 14, wherein the instructions, when executed by one or more processors, cause the one or more processors to perform operations comprising using the at least one domain name to determine geo-location data associated with the at least one domain name and using the geo-location data as the at least one numeric feature.

16. The apparatus of claim 15, wherein the instructions, when executed by one or more processors, cause the one or more processors to perform operations comprising creating the link-level input data by concatenating the first unit-level classification data and the second unit-level classification data and the ASN data and the geo-location data.

17. The apparatus of claim 11, the first and second deep learning models having been trained to classify sequences of characters that include bait text that is predictive of phishing differently than sequences of characters that do not include the bait text.

18. The apparatus of claim 11, the first and second deep learning models having been trained to classify different sequences of bait text and non-bait text and separators differently.

19. The apparatus of claim 11, the first and second and third deep learning models comprising artificial convolutional neural networks or layers of an artificial convolutional neural network.

20. The apparatus of claim 11, wherein the instructions, when executed by one or more processors, cause the one or more processors to perform operations comprising receiving the electronic message from a message transfer application on the network.

21. A system comprising:
one or more processors;
one or more non-transitory storage media storing instructions which, when executed by the one or more processors, cause:
extracting, from a link contained in an electronic message received from an upstream device on a network, first unit-level input data of a first semantic type and second unit-level input data of a second semantic type;
in response to inputting the first and second unit-level input data into first and second deep learning models, respectively, outputting, by the first and second deep learning models, first and second unit-level classification data that corresponds to the first and second unit-level input data, respectively, the first deep learning model having been trained to recognize, in unit-level data of the first semantic type, first patterns of syntactic features and semantic features that are predictive of phishing and the second deep learning model having been trained to recognize, in unit-level data of the second semantic type, second patterns of syntactic features and semantic features that are predictive of phishing;

combining the first and second unit-level classification data with at least one numeric feature that has been extracted from context data to produce link-level input data;

in response to inputting the link-level input data into a third deep learning model, outputting, by the third deep learning model, link-level classification data, the third deep learning model having been trained to recognize patterns of syntactic features and semantic features and numeric features that are predictive of phishing;

in response to the link-level classification data matching a criterion, causing the network to modify, delay, or block transmission of the electronic message to a downstream device.

22. The system of claim 21, wherein the instructions, when executed by one or more processors, cause the one or more processors to perform operations comprising performing the extracting of the first unit-level input data using a grammar to identify a sequence of characters in the link that corresponds to at least one domain name.

23. The system of claim 21, wherein the instructions, when executed by one or more processors, cause the one or more processors to perform operations comprising performing the extracting of the second unit-level input data using a grammar to identify a sequence of characters in the link that corresponds to at least one path name.

24. The system of claim 22, wherein the instructions, when executed by one or more processors, cause the one or more processors to perform operations comprising using the at least one domain name to determine Autonomous System Number (ASN) data associated with the domain name and using at least some of the ASN data as the at least one numeric feature.

25. The system of claim 24, wherein the instructions, when executed by one or more processors, cause the one or more processors to perform operations comprising using the at least one domain name to determine geo-location data associated with the at least one domain name and using the geo-location data as the at least one numeric feature.

26. The system of claim 25, wherein the instructions, when executed by one or more processors, cause the one or more processors to perform operations comprising creating the link-level input data by concatenating the first unit-level classification data and the second unit-level classification data and the ASN data and the geo-location data.

27. The system of claim 21, the first and second deep learning models having been trained to classify sequences of characters that include bait text that is predictive of phishing differently than sequences of characters that do not include the bait text.

28. The system of claim 21, the first and second deep learning models having been trained to classify different sequences of bait text and non-bait text and separators differently.

29. The system of claim 21, the first and second and third deep learning models comprising artificial convolutional neural networks or layers of an artificial convolutional neural network.

30. The system of claim 21, wherein the instructions, when executed by one or more processors, cause the one or more processors to perform operations comprising receiving the electronic message from a message transfer application on the network.

* * * * *